United States Patent [19]

Swinkels et al.

[11] 4,201,748

[45] May 6, 1980

[54] PROCESS FOR THERMAL-ACTIVATION OF CHALCOPYRITE-PYRITE CONCENTRATES

[75] Inventors: Godefridus M. Swinkels, Rossland; Dennis G. Maschmeyer, Fort Saskatchewan, both of Canada

[73] Assignees: Cominco Ltd., Trail; Sherritt Gordon Mines Limited, Toronto, both of Canada

[21] Appl. No.: 933,401

[22] Filed: Aug. 14, 1978

[30] Foreign Application Priority Data

Aug. 19, 1977 [CA] Canada .................................. 285111

[51] Int. Cl.² .................. C01G 3/12; C01G 49/14
[52] U.S. Cl. ........................... 423/27; 75/1 R; 75/6; 75/7; 423/23; 423/37; 423/47; 423/145; 423/150; 423/571; 423/542; 423/563; 423/151
[58] Field of Search ............... 423/37, 47, 150, 145, 423/531, 542, 561, 563, 151, 152, 632, 27; 75/1, 6, 7

[56] References Cited

U.S. PATENT DOCUMENTS

| | | | |
|---|---|---|---|
| 2,878,102 | 3/1959 | Sternfels | 423/47 |
| 3,053,651 | 9/1962 | McGauley | 423/154 |
| 3,169,853 | 2/1965 | Van Es | 423/632 |
| 3,964,901 | 6/1976 | Swinkels et al. | 423/47 |

OTHER PUBLICATIONS

Swinkels et al., "The Sherritt-Cominco Process" *CIM Bulletin* Feb. 1978, pp. 105-108, 110, 112-114, 121, 132, 134, 136, 137.

*Primary Examiner*—Herbert T. Carter
*Attorney, Agent, or Firm*—Arne I. Fors; Robert F. Delbridge

[57] ABSTRACT

A process for thermal activation of chalcopyrite-pyrite ore concentrates for activation of iron values in both chalcopyrite and pyrite constituents whereby said iron values can be selectively removed in a subsequent acid leach. Controlled oxidizing conditions are maintained in an oxidizing heating zone for removal of up to about 90% of total sulfur to be removed for conversion of pyrite and chalcopyrite to their acid-leachable forms, measured by a preferable oxidation of 10 to 15% of iron in the concentrate to ferromagnetic oxides, whereby remaining total sulfur to be removed is removed in a reducing zone with the assistance of a low $H_2S/(H_2+H_2S)$ ratio by scavenging of $H_2S$ by said oxides.

10 Claims, 2 Drawing Figures

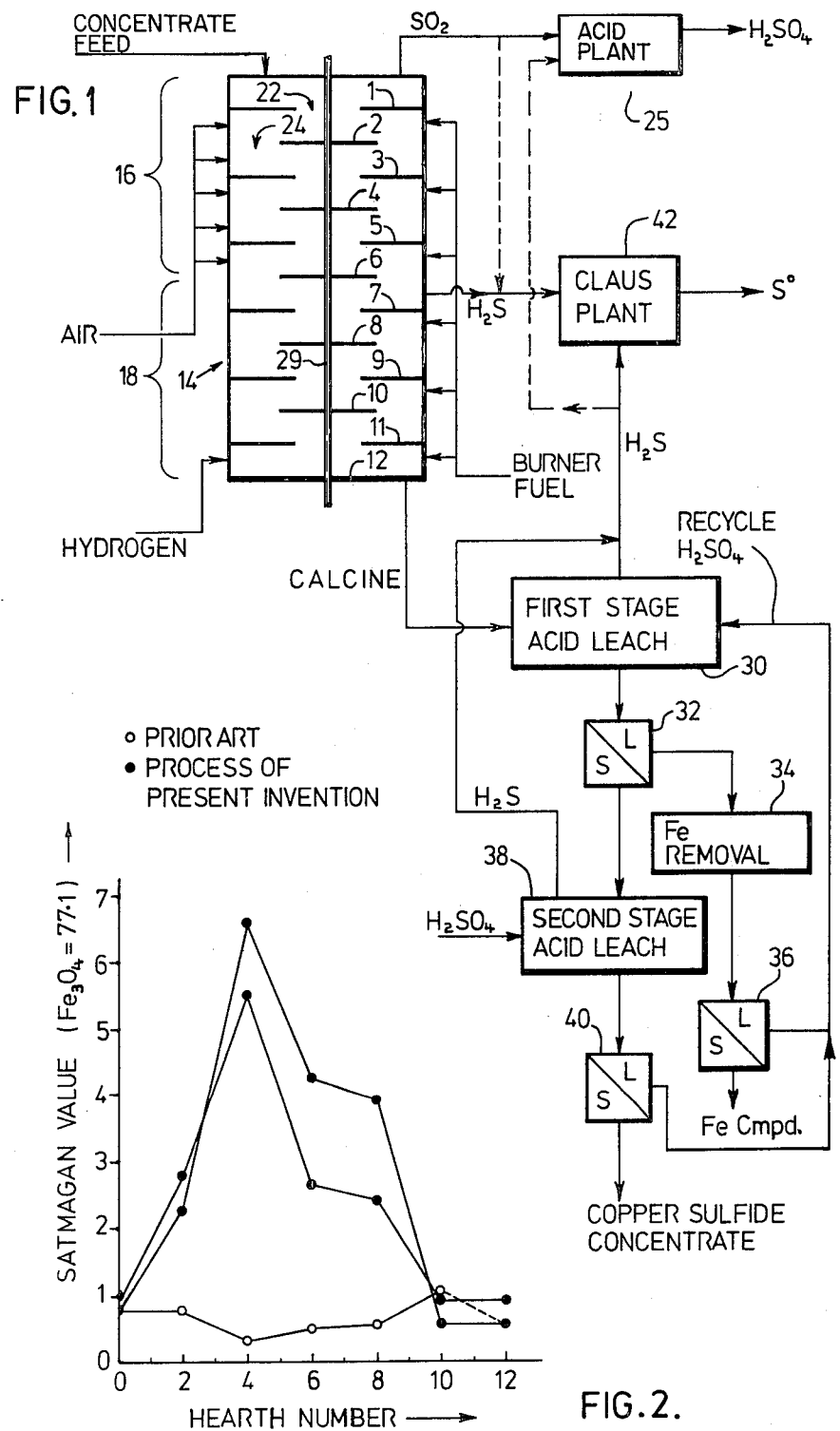

PROCESS FOR THERMAL-ACTIVATION OF CHALCOPYRITE-PYRITE CONCENTRATES

BACKGROUND OF THE INVENTION

The present invention relates to a process for treating metal sulfides such as copper concentrates containing chalcopyrite and pyrite for rendering copper and iron values amenable to selective leaching and separate recovery.

It is known to heat metal sulfide concentrates to remove labile sulfur and to activate the sulfide mineral mixture whereby a major portion of sulfidic iron can be leached from the said mixture permitting subsequent leaching of copper values substantially free of iron values. U.S. Pat. No. 3,053,651 discloses such a process wherein sulfide mixtures containing iron are heated to liberate labile sulfur and wherein a predetermined amount of metallic iron to provide a sulfur to iron mol ratio of less than 1:1 is added to the residual hot solids and agitated therewith in the presence of a reducing gas such as hydrogen until all of the iron content is capable of dissolution in sulfuric acid. The metallic iron may be added in the form of iron oxide produced in situ and reduced to its metallic state.

U.S. Pat. No. 3,857,767 discloses a process for recovery of copper from chalcopyrite ore concentrates in which the concentrates are partially roasted in a fluidized bed under controlled oxidizing conditions whereby excessive oxidation resulting in the formation of iron oxides such as hematite and magnetite which catalyze conversion of copper compounds to soluble copper sulfate is to be avoided. Roasting of the concentrates thus is to be terminated prior to formation of the iron oxides.

It is taught in U.S. Pat. No. 3,964,901 that copper-containing pyritic metal sulfides can be thermally activated for preferential selective leaching of iron values from copper values by heating said sulfides sequentially in a reactor in an effectively non-oxidizing atmosphere and then in a reducing atmosphere for liberation of labile sulfur and controlled combustion of said labile sulfur and any combustible gases by the addition of a limited amount of an oxygen-containing gas to maintain a desired reactor temperature in said non-oxidizing atmosphere and achieve reduction of the delabilized sulfides without formation of metal oxides whereby the pyritic iron is converted to an acid leachable form.

SUMMARY OF THE INVENTION

The present invention is directed to a process for thermal activation of chalcopyrite-pyrite ore concentrates for activation of iron values contained in both the chalcopyrite and pyrite ore constituents whereby the iron values can be removed in a subsequent acid leach.

It is believed the improvement in thermal activation of ore concentrates results in large part from the maintenance of controlled oxidizing conditions in an oxidizing heating zone for oxidation of metal sulfides, as can be measured by formation of ferromagnetic properties of the iron oxides, wherein up to about 90% of "total sulfur to be removed" for conversion of pyrite and chalcopyrite to their selectively acid-leachable forms is evolved and consumed to provide heat and the remaining "total sulfur" to be removed is readily removed in the reducing zone with the assistance of a low $H_2S/(H_2+H_2S)$ ratio by scavenging of $H_2S$ gas by the iron oxides.

The "total sulfur to be removed" from the concentrate is defined as that part of the sulfur originally present which is left over after the stoichiometric sulfur requirements for the formation of $Cu_5FeS_4$, $ZnS$ and $FeS$ from the copper, iron and zinc minerals present in the original concentrate are satisfied.

Extractability of iron as high as 90 to 93% in a subsequent acid leach after use of a reducing zone bed temperature of about 700° C. has been obtained. This high extractability of iron after reduction is attained at low bed temperatures which is desirable in order to prevent fusion and agglomeration of the feed with attendant resulting mechanical problems in the reactor which can occur at higher bed temperatures.

There is thus provided a process for treating metal sulfide concentrates containing chalcopyrite and pyrite for converting sulfidic iron to an acid leachable form and for rendering copper and other non-ferrous metal values amenable for separate recovery, which comprises the steps of: heating said metal sulfide concentrates in an oxidizing zone to an elevated temperature in an oxidizing atmosphere for removal of labile sulfur and for formation of metal oxides by evolution and combustion of up to about 90% of total sulfur to be removed for converting said sulfidic iron and chalcopyrite to selectively acid leachable forms, contacting said delabilized metal sulfide concentrates containing metal oxides in a reducing zone with a reducing gas capable of accepting sulfur whereby conversion of sulfidic iron in said sulfides to an acid leachable form is completed by evolution of $H_2S$ gas concurrent with reduction of said metal oxides to sulfides, at least in part through reaction between metal oxides and $H_2S$, whereby said metal oxides are a scavenger of said $H_2S$ gas resulting in the formation of metal sulfides and water, and contacting said metal sulfide concentrates containing metal oxides in the oxidizing zone with a portion of said reducing gas and $H_2S$ gas from said reducing zone and with an excess of oxygen for substantial combustion of said reducing gas and $H_2S$ and labile sulfur to provide heat for said oxidizing zone to convert sulfur values to $SO_2$ for discharge from said oxidizing zone and to provide said oxidizing atmosphere to partially oxidize the metal sulfides to metal oxides.

The process of our invention can be conducted in a multiple hearth vertical roaster comprising an oxidizing zone and reducing zone in which the oxidizing atmosphere maintained in the oxidizing zone contains an excess of oxygen such that oxygen is contained in off-gases in the amount of about 1 to 6% by volume after combustion of the reducing gas, labile sulfur and $H_2S$, and desired oxidation of metal sulfides. The major reactions believed occurring in the oxidizing zone are represented by the following equations:

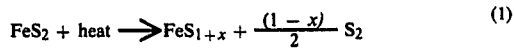

where x is usually 0.10 to 0.18

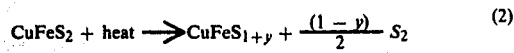

where y is usually near 0.8

$$S_2 + 2O_2 \rightarrow 2SO_2 + \text{heat} \tag{3}$$

$$FeS_{1+x} + (1.75+x)O_2 \rightarrow 0.5Fe_2O_3 + (1+x)SO_2 + \text{heat} \tag{4}$$

$$FeS_{1+x} + (1.67+x)O_2 \rightarrow 0.33Fe_3O_4 + (1+x)SO_2 + \text{heat} \tag{5}$$

$$CuFeS_{1+y} + (2.5+y)O_2 \rightarrow 0.5CuSO_4 + 0.5CuO \cdot Fe_2O_3 + (0.5+y)SO_2 + \text{heat} \tag{6}$$

The labile sulfur is removed by reactions (1) and (2) wherein pyrite and chalcopyrite commence to evolve sulfur at about 400° C. and 550° C. respectively. The vaporized labile sulfur is oxidized with the oxygen of injected air according to reaction (3) to form $SO_2$ and to supply heat to the process. Additional heat, which may be required to heat incoming feed to the desired temperature range, to be discussed hereinbelow, is provided by combustion of gases introduced from the reducing zone and combustion of fuel injected as required.

The excess oxygen reacts with the metal sulfide solids according to reactions (4), (5) and (6) to produce hematite and magnetite and copper ferrite which exhibit ferromagnetic properties. This oxidation of a quantity of non-stoichiometric iron sulfide to iron oxides is believed to substantially enhance effectiveness of the thermal activation by initially increasing removal of sulfur beyond volatilization of labile sulfur and by providing a scavenger of $H_2S$ gas in the reducing zone in which reactions represented by the following equations are believed to occur:

$$FeS_{1+x} + xH_2 \rightleftharpoons FeS + xH_2S \tag{7}$$

$$5CuFeS_{1.8} + H_2 \rightleftharpoons Cu_5FeS_4 + 4FeS + H_2S \tag{8}$$

$$2Cu_5FeS_4 + H_2 \rightleftharpoons 5Cu_2S + 2FeS + H_2S \tag{9}$$

$$Fe_aO_b + aH_2S + (b-a)H_2 \rightleftharpoons aFeS + bH_2O \tag{10}$$

$$Fe_aO_b + H_2S \rightleftharpoons Fe_{(a-1)}O_{(b-1)} + H_2O + FeS \tag{11}$$

$Fe_aO_b$ represents iron oxides such as for example FeO, $Fe_2O_3$ and $Fe_3O_4$.

Reactions (7), (8) and (9), when near completion, provide acid soluble iron for selective leaching of the iron from the copper sulfides. The consumption of $H_2S$ gas as represented by reactions (10) and (11) is beneficial in scavenging the $H_2S$ gas to provide a low $H_2S/(H_2+H_2S)$ ratio and to drive reversible reactions (7) through (9) forward with resulting provision of additional acid-soluble iron.

BRIEF DESCRIPTION OF THE DRAWINGS

The process of the invention will now be described with reference to the accompanying drawings, in which:

FIG. 1 is a schematic illustration of a roaster and acid leach system depicting material flow in accordance with the process of the invention; and FIG. 2 is a graph showing ferromagnetic values of calcine as the calcine is processed through the roaster of FIG. 1.

DESCRIPTION OF THE PREFERRED EMBODIMENT OF THE INVENTION

The process of our invention preferably is conducted in a multiple hearth roaster permitting counter-current gas-to-solid contact between descending solids and rising oxidizing and reducing gases. With reference to FIG. 1, the said process was carried out in a multiple hearth roaster 14 consisting of a refractory-lined Hereshoff furnace having an oxidizing zone 16 (hearths 1–6) and a reducing zone 18 (hearths 7–12). Roaster 14 had a height of 12.4 m, inside diameter of 1.9 m and 12 hearths for an effective total hearth area of 21.1 m². Sixteen peripheral drop holes 24 having a total area of 0.4 m² and one central drop hole 22 having an area of 0.7 m² were located in each hearth. Feed concentrate introduced to the roaster top was sequentially advanced vertically downwardly through the roaster alternately inwardly and outwardly on consecutive hearths from hearth 1, having central drop hole 22, onto hearth 2 having a plurality of equispaced peripheral drop holes 24, and the like alternating progression, to hearth 12 having an outlet for discharge of calcine. Rabble arms, not shown, rotated about central axis 29 of the roaster to push the concentrate inwardly on hearths having central outlets 22 and outwardly on hearths having peripheral outlets 24.

A reducing gas for reducing zone 18 was supplied by hydrogen introduced at the bottom of the roaster at hearth 12 for upward flow counter-current to the downwardly flow of concentrate. Most of the reducing gases from the reducing zone 18, comprising hydrogen, $H_2S$ and CO, were bled from the roaster at hearth 7 in order to maintain temperature control and excess oxygen concentration in the oxidizing zone 16, as will be discussed below.

Oxygen requirements for oxidizing zone 16 can be provided by injection of oxygen, air or oxygen-enriched air. The process of the invention was operated with air injected at hearths 2 through 6. Heat to initiate and maintain the operation of the process was supplied by natural gas burners at hearths 2, 4, 6, 8, 10 and 12; gas burners on hearths 8, 10 and 12 normally fired continuously and gas burners on hearths 2, 4 and 6 fired intermittently as required for temperature control. Combustion air was supplied to each burner as necessary.

Feed to roaster 14, usually dried to about 0.5% to 1.0% free moisture, can be concentrates of metal sulfides such as pyritic copper sulfides containing chalcopyrite, pyrrhotite and pyrite and lesser amounts of other sulfides including sphalerite and molybdenite. The feed composition does not affect iron extractability in the final calcine but does affect the copper:sulfur ratio and thus the quantity of sulfur available for removal by delabilization and the roaster temperature, to be described.

We have found that particle size of concentrate is not critical for successful activation, the normal degree of comminution for beneficiation of metal sulfide values usually being satisfactory. Pellets reduced dusting and alleviated sintering at high temperature. Alternatively, the concentrate can be fed unconsolidated, with attainment of essentially the same metallurigcal results in the roaster, particularly as to iron extractability in the calcine. Typical concentrate feed ranged in size from about 40% in the range of 44 to 250μ, the remaining portion being smaller than 44μ. Pelletized feed ranged in size from about 60% in the range of 0.3 to 1.0 cm with the remaining portion being smaller than 0.3 cm. A typical screen analysis of an unpelletized copper concentrate feed with chemical analysis is shown in Table 1.

Table 1

| Size Distribution | | Fraction Analyses (%)[1] | | | | | |
|---|---|---|---|---|---|---|---|
| Size (μ) | Fract. (%) | Cu | Fe | $S_T$ | Zn | Σ | gangue[2] |
| Head | 100 | 26.7 | 30.3 | 34.8 | 2.78 | 94.58 | 5.42 |
| +250 | 0.16 | NA | NA | NA | NA | | |
| 250/177 | 0.58 | 26.3 | 27.3 | 29.3 | 2.26 | 85.16 | 14.84 |
| 177/125 | 2.60 | 28.9 | 29.2 | 33.2 | 1.83 | 93.13 | 6.87 |
| 125/88 | 10.36 | 29.3 | 30.9 | 35.5 | 1.72 | 97.42 | 2.58 |
| 88/62 | 13.49 | 27.7 | 31.0 | 35.9 | 2.16 | 96.76 | 3.24 |
| 62/44 | 12.69 | 25.7 | 30.6 | 35.4 | 2.96 | 94.66 | 5.34 |
| −44 | 60.12 | 25.7 | 30.6 | 34.4 | 3.02 | 93.72 | 6.28 |

[1] wet screen analysis
[2] by difference

The feed rate of concentrate to roaster 14 and retention time within the oxidizing and reducing zones 16,18 were controlled to effectively complete the process reactions. Residence time was essentially controlled by adjustment of the rate of rotation of the rabble arms. A residence time of solids in the roaster in the range of 50 to 100 minutes provided acid-leach calcine Fe extractability of from 50 to 93%. Preferred residence times were in the range of from 80 to 100 minutes.

The preferred operating solids temperature range in the oxidizing zone 16 was 450° to 470° C. at hearths 2 and 3 and 655° to 680° C. at hearths 4, 5 and 6 for vaporization of labile sulfur according to reactions (1) and (2) and for combustion of the labile sulfur according to reaction (3). The desired solids bed temperature in hearths 7 through 12 of the reducing zone 18 was found to be in the range 680° to 705° C. to avoid solids agglomeration which occurs at higher temperatures and to obtain optimum calcine activity.

Air was injected into the oxidizing zone to combust the labile sulfur and any $H_2$, CO and $H_2S$ gases from the reducing zone. Process heat requirements were met principally by labile sulfur oxidation since about 80 to 95% of reducing gases were bled off at hearth 7 to control the temperature in the oxidizing hearths above. Air in excess of combustion requirements was available to oxidize concentrates to metal oxides according to reactions (4), (5) and (6). We have found that the oxygen addition desired in the oxidation zone 16 is such that an off-gas containing about 1 to 6% by volume oxygen results. All gas measurements are dry basis. The air was introduced to hearths 2 through 6 with about 80% of the air split between hearths 3 and 4 and the balance between hearths 2, 5 and 6 according to temperature profile requirements.

It was found desirable to remove in the oxidizing zone 16 up to about 90% of the "total sulfur to be removed" from the concentrate in order to obtain a final calcine from the reducing zone 18 which calcine contains a satisfactory quantity of the contained iron in an easily acid leachable form.

The "total sulfur to be removed" from the concentrate has been defined above as part of the sulfur originally present which is left over after the stoichiometric sulfur requirements for the formation of $Cu_5FeS_4$, ZnS and FeS from the copper, iron and zinc minerals present in the original concentrate are satisfied.

For concentrates with a low amount of total sulfur to be removed, for example, bornite-chalcopyrite concentrates, the use of burners to supplement the heat generated by the combustion of labile sulfur in the oxidizing zone 16 and to maintain the solids temperature profile may be required. Conversely, for concentrates with a high amount of total sulfur to be removed, for example, chalcopyrite-high pyrite concentrates, combustion of adequate amounts of labile sulfur satisfy heat requirements and accordingly the use of upper burners is obviated.

Besides the control over the admission of air, the use of ancillary fuel burners and/or the use of added water are means of maintaining the desired temperature profile, heat transfer conditions and heat balance relative to a particular throughput rate for a particular concentrate.

The introduction of hydrogen at hearth 12 for a hydrogen concentration at hearth 11 of the reducing zone greater than 18% by volume provided maximum acid-soluble iron by reactions (7) through (11); reactions (7) through (9) producing $H_2S$ which was scavenged in part by the oxides according to reactions (10) and (11) to produce a desirable low $H_2S/(H_2+H_2S)$ ratio equal to or less than 0.1:1, preferably about 0.05:1. A hydrogen concentration below 18% was not sufficient for the activation process.

For the process carried out according to the conditions described for the oxidizing and reducing zones, the requirements for acid leachability normally dictate that the final calcine contains 60 to 90% of the iron in compounds in which the iron:sulfur molar ratio is near or equal to unity. The balance of the iron may be present in association with other metal sulfides, for example, in copper-iron sulfides such as bornite, or in iron sulfides which have an iron:sulfur molar ratio substantially less than unity, which iron sulfides are not acid leachable.

Comparative tests were conducted in the multiple hearth roaster schematically illustrated in FIG. 1 on an pelletized concentrate introduced at feed rates of 350 to 400 kg/hr with (i) low air injection and no reducing zone bleed, (ii) low air injection and high reducing zone bleed, and (iii) high air injection and high reducing zone bleed with operating conditions and results as shown in Table 2 below.

Table 2

| | | | Flow (m³/hr) | | | | Calculated Percentage |
|---|---|---|---|---|---|---|---|
| Feed (%) | | Feed Rate Kg/hr | Top Air Inj. | Hth. 12 $H_2$ | Hth. 7 Bleed | Natural Gas Fuel (m³/hr) | | of Feed Iron Oxidized to $Fe_2O_3$ |
| Test (i) | | | | | | | | |
| Cu | 25.4 | 360 | 210 | 40 | 0 | OZ[1] | 0 | 0.0 |
| Fe | 30.0 | | | | | | | |
| Zn | 2.65 | | | | | | | |
| S | 33.8 | | | | | RZ[2] | 21.3 | |
| Gangue | 8.15 | | | | | | | |
| Test (ii) | | | | | | | | |
| Cu | 26.4 | 370 | 220 | 45 | 210 | OZ | 0 | 6.0 |
| Fe | 29.7 | | | | | | | |
| Zn | 2.4 | | | | | | | |

Table 2-continued

|   | | | | | | | | |
|---|---|---|---|---|---|---|---|---|
| S | 33.6 | | | | | RZ | 27.4 | |
| Gangue | 7.9 | | | | | | | |
| Test (iii) | | | | | | | | |
| Cu | 23.3 | 400 | 290 | 35 | 180 | OZ | 2.6 | 12.2 |
| Fe | 28.3 | | | | | | | |
| Zn | 3.24 | | | | | | | |
| S | 32.4 | | | | | RZ | 20.4 | |
| Gangue | 12.76 | | | | | | | |

| Hth. 12 Calcine Fe Extractability (%) | Temperatures (°C.) | | SO$_2$ Off. Gas | Gas Component | Gas Analyses (Vol. %, dry basis) | | | | Comment |
|---|---|---|---|---|---|---|---|---|---|
| | Calcine | Bleed Gas Hth. 7 | | | Mat. Balance | | Anal. Lab. | | |
| | | | | | Exit | Hth. 7 | Exit | Hth. 7 | |
| Test (i) | | | | | | | | | |
| 59.0 | 704 | 722 | 380 | H$_2$ | 0.6 | 20.0 | 0.2 | | |
| | | | | CO | 0.2 | 5.3 | 0.3 | | |
| | | | | CO$_2$ | 6.7 | 5.9 | 4.6 | | Low Air Inj. |
| | | | | N$_2$ | 89.4 | 65.7 | 91.0[4] | NA[3] | No Drawoff |
| | | | | H$_2$S | 0.1 | 3.1 | — | | |
| | | | | SO$_2$ | — | — | — | | |
| | | | | O$_2$ | 3.1 | — | 2.8[5] | | |
| Test (ii) | | | | | | | | | |
| 64.5 | 707 | 722 | 380 | H$_2$ | 0.3 | 18.5 | <.1 | | |
| | | | | CO | 0.1 | 5.5 | 0.2 | | |
| | | | | CO$_2$ | 3.5 | 6.1 | 4.4 | | Low Air Inj. |
| | | | | N$_2$ | 83.8 | 68.2 | 89.6[4] | NA | High Drawoff |
| | | | | H$_2$S | 0.02 | 1.7 | — | | |
| | | | | SO$_2$ | 5.8 | — | — | | |
| | | | | O$_2$ | 6.5 | — | 4.8[5] | | |
| Test (iii) | | | | | | | | | |
| 84.8 | 693 | 700 | 427 | H$_2$ | 0.1 | 17.4 | <.1 | 14.4 | |
| | | | | CO | 0.03 | 5.4 | 0.2 | 4.0 | |
| | | | | CO$_2$ | 2.0 | 6.4 | 3.1 | 6.4 | High Air Inj. |
| | | | | N$_2$ | 82.0 | 70.0 | 87.8[4] | 72.2 | High Drawoff |
| | | | | H$_2$S | — | 0.7 | — | — | |
| | | | | SO$_2$ | 5.8 | — | — | — | |
| | | | | O$_2$ | 10.0 | — | 7.7[5] | — | |

NOTE:
[1] OZ Oxidizing Zone
[2] RZ Reducing Zone
[3] NA No analysis available
[4] Nitrogen analysis by lab includes SO$_2$.
[5] Figure given is for oxygen only. A value of 1.0 has been used for % Argon which has been subtracted from the laboratory gas analyses.

Test (i) with the low air injection and no reducing zone bleed resulted in the utilization of most of the oxygen in the injected air for combustion leaving essentially no free oxygen for oxidation of the sulfides. The H$_2$S/(H$_2$+H$_2$S) ratio at hearth 7 was 0.134:1.0 and iron extractability of hearth 12 calcine was a low 59%. Acid leachable iron is the iron that would be leached in the laboratory in 1 hour at reflux temperature ending in a final acid concentration of 100 to 150 g/l H$_2$SO$_4$. The low injection air flow and high reducing zone bleed of test (ii) allowed a calculated 6.0% oxidation of the feed iron. The H$_2$S/(H$_2$+H$_2$S) ratio was reduced to 0.084:1.0 and hearth 12 calcine iron extractability was increased to 64.5%. The high injection air flow with high reducing gas bleed of test (iii) permitted a calculated 12.2% oxidation of the feed iron. The H$_2$S/(H$_2$+H$_2$S) ratio was further decreased to 0.038:1.0 and hearth 12 calcine iron extractability was increased to 84.8% despite a reduction of calcine temperature to 693° C. The significance of the hearth 7 bleed of reducing gases to permit desired delabilization and oxidation in the oxidizing zone 16 at the desired low calcine temperature is apparent.

Oxygen consumption and air requirements vary not only with the amount of reducing gas bleed at hearth 7 but also with the sulfide composition of the concentrate feed, the solids feed rate and retention time, quantity and composition of exit gases from the oxidizing zone 16, degree of oxidation of the metals in the concentrate and amount of combustible gases entering the oxidizing zone 16 from the reducing zone 18. The measurement of relative magnetic response of the calcine as it passed through roaster 14 was found to provide a convenient indication of the degree of oxidation of the concentrate metals. A Satmagan (Trade Mark) magnetic balance was used and typical results of magnetic response for calcines from two operating periods produced according to the process of the present invention measured at various hearths, compared to the magnetic response for a calcine produced according to the process of U.S. Pat. No. 3,964,901, are illustrated in the graph of FIG. 2.

The ordinate readings based on a value of 77.1 for the magnetic response to pure magnetite show readings in excess of 5 at hearth 4 which indicate that 10 to 15% of iron was in the form of ferromagnetic oxides. The ordinate readings decreased rapidly from the maximum reading at hearth 4 to a reading of 1.0, i.e. no magnetic oxides in final calcines.

The acid leachable sulfide concentrate or calcine can be water quenched for storage prior to feeding to an acid leach. Permissible storage time of aerated slurries before noticeable de-activation of the calcine, i.e. before decrease in leachability of iron occurs, has been established at 24 hours at 20° C. and 8 hours at 70° C. A non-oxidizing atmosphere such as is provided by a nitrogen blanket will greatly extend permissible storage time.

The acid leachable sulfide concentrate or calcine is subjected to an acid leach in aqueous sulfuric acid to produce a solution of ferrous sulfate and a beneficiated solids residue containing copper sulfides, which are amenable to recovery of copper, and residual iron with concurrent evolution of $H_2S$ gas.

Calcine preferably is fed directly from the roaster to a two-stage acid leach as described in co-pending U.S. application Ser. No. 933,372. The acid leach comprises a first-stage acid leach 30 wherein the sulfides are mixed with an acid solution for the dissolution of iron as ferrous sulfate with concurrent evolution of $H_2S$ gas. The acid solution, which contains sulfuric acid in a concentration in the range of 60 to 130 g/l, 15 to 40 g/l iron as ferrous sulfate and is essentially free of copper, should have as low a zinc content as possible, as under the conditions of this leach zinc contained in the acid solution and zinc dissolved from activated sulfides precipitate on calcine particles. The precipitated zinc sulfide impairs the leachability of iron from the calcine and thus reduces the iron extraction. The zinc content of the solution in this first stage acid leach therefore is maintained at less than 5 g/l.

The first stage acid leach 30 is carried out in one or more closed, agitated vessels. Froth breakers and foam baffles may be employed to control foaming and to stop short circuiting of material due to flotation.

Leach 30 is carried out at temperatures in the range of 60° to 100° C., but in order to obtain good iron extraction the temperature should be at least 75° C., preferably in the range of 95° to 100° C. The pressure of the leach is essentially atmospheric pressure, but a slightly sub-atmospheric pressure is preferred to maintain a hygienic operation. Retention times in the range of 30 to 120 minutes are adequate to obtain the required degree of extraction.

After completion of the first-stage acid leach, the leach slurry, which may contain from 10 to 30 g/l sulfuric acid and from 20 to 120 g/l iron as ferrous sulfate, is subjected to a liquid-solids separation 32 and the liquid fraction from separation 32 is passed to an iron removal step 34 such as jarosite precipitation.

In jarosite precipitation 34, the ferrous sulfate-containing solution is oxidized and hydrolyzed in the presence of ammonia, or a suitable ammonium, or alkali-metal compound to precipitate substantially all iron in the solution as jarosite with simultaneous generation of sulfuric acid solution. The precipitation of jarosite is carried out in an agitated pressure vessel at temperatures in the range of 100° to 230° C. and at an oxygen partial pressure in the range of 50 to 1400 kPa.

Precipitated jarosite is separated from generated sulfuric acid-containing solution in liquid-solids separation 34 and the acid, which contains sulfuric acid in the range of 40 to 60 g/l and not more than 15 g/l iron and 5 g/l zinc, is recycled to first-stage acid leach 30.

The solids fraction from liquid-solids separation 32 is fed to second-stage acid leach 38 in which the said solids fraction is mixed with sulfuric acid in an amount sufficient to form a slurry. High acid concentrations are required to maximize the extraction of iron. Concentrated sulfuric acid, for example, of 93% strength, is mixed with the solids fraction in an amount sufficient to give an acid concentration in the range of 200 to 250 g/l. The temperature of the reaction slurry in second-stage leach 38 is maintained in the range of 60° to 100° C., preferably in the range of 80° to 95° C.

The reacted slurry is passed to liquid-solids separation 40 and the liquid fraction recycled to first-stage acid leach 30.

The solids fraction containing beneficiated solids residue containing copper sulfides and residual iron can be treated by an oxidation leach as described in U.S. Pat. No. 3,964,901 in an integrated process for production of elemental sulfur and copper sulfate solution which is suitable for recovery of high purity copper by electrowinning or hydrogen reduction. Precious metals and zinc and other non-ferrous metals can be recovered separately.

Alternatively, the thermal activation of pyritic copper sulfides, acid leaching and iron removal can be operated as an independent process to upgrade poor primary concentrates at a mine site for shipping of the improved concentrate, i.e. beneficiated solids residue from the acid leach, to an existing smelter. This would yield an overall higher copper recovery from ore to metal, reduction in freight charges, savings in smelting costs and improved environmental control. Concentrates from such upgrading could, for example, be treated by simplified smelting methods such as converting in an oxygen lanced top blown rotary converter followed by electrorefining.

The $SO_2$-containing roaster exit gases are passed to an acid plant 25 after scrubbing for dust removal for production of sulfuric acid suitable for use in the acid leach 30,38. Hydrogen sulfide gas evolved from the reducing zone 18 bleed and from the acid leach 30,38 is drawn off to a Claus plant for the recovery of elemental sulfur. A portion of hydrogen sulfide gas can be burned to $SO_2$ and added to roaster $SO_2$ gases for increased acid production as may be required for sale or for processing of activated concentrate for recovery of copper.

Iron removal step 34 can comprise jarosite precipitation, as described, or hematite or hydrated ferric oxide precipitation. The acid plant and Claus plant productions of sulfuric acid and elemental sulfur respectively from $SO_2$ and $H_2S$ from the roaster and acid leach can be balanced to meet process acid requirements with excess sulfur produced in elemental form independent of the manner in which the iron may be removed from the system.

The process of the present invention provides a number of important advantages. The controlled limited oxidation of concentrates in the oxidation zone of a two-stage oxidation-reduction roast enhances sulfur removal in the oxidation zone to not only decrease the requirement for sulfur removal in the reducing zone, but also provide a $H_2S$-scavenging environment in the reducing zone which lowers $H_2S$ concentration. We have also found that a desired degree of activation of a concentrate can be achieved at a desirably lower roaster temperature to substantially obviate problems of fusion and agglomeration of the concentrate within the roaster.

The process can be operated as an independent process to provide upgrading of low-grade pyritic copper sulfides at a mine site with important subsequent process economies associated with either pyrometallurgical or hydrometallurgical treatment of resulting concentrates at a central plant, or operated as an integrated process for recovery and production of sulfur in its elemental form and of high-purity copper.

It will be understood of course that modifications can be made in the embodiment of the invention illustrated and described herein without departing from the scope and purview of the invention as defined by the appended claims.

What we claim as new and desire to protect by Letters Patent of the United States is:

1. A process for treating metal sulfide concentrates containing chalcopyrite and pyrite for converting sulfidic iron to an acid leachable form and for rendering copper and other non-ferrous metal values amenable for separate recovery, which comprises the steps of: heating said metal sulfide concentrates in an oxidizing zone to an elevated temperature in an oxidizing atmosphere for removal of labile sulfur and for formation of metal oxides by evolution and combustion of up to about 90% of total sulfur to be removed for converting said sulfidic iron and chalcopyrite to selectively acid leachable forms, contacting said delabilized metal sulfide concentrates containing metal oxides in a reducing zone with a reducing gas containing hydrogen in a concentration in the range of about 18 to 24% by volume capable of accepting sulfur whereby conversion of sulfidic iron in said sulfides to an acid leachable form is completed by evolution of $H_2S$ gas concurrent with reduction of said metal oxides to sulfides, at least in part through reaction between metal oxides and $H_2S$, whereby said metal oxides are a scavenger of said $H_2S$ gas resulting in the formation of metal sulfides and water, maintaining a ratio of $H_2S/(H_2+H_2S)$ equal to or less than 0.1:1.0 in said reducing zone, and contacting said metal sulfide concentrates containing metal oxides in the oxidizing zone with a portion of said reducing gas and $H_2S$ from said reducing zone and with an excess of oxygen for substantial combustion of said reducing gas and $H_2S$ and labile sulfur to provide heat for said oxidizing zone to convert sulfur values to $SO_2$ for discharge from said oxidizing zone and to provide said oxidizing atmosphere to partially oxidize the metal sulfides to metal oxides whereby about 10 to 15% of iron in said metal sulfide concentrates in the oxidizing zone is oxidized to ferromagnetic oxides and off-gases from said oxidizing zone contains 1 to 6% by volume oxygen.

2. A process as claimed in claim 1, in which said reducing gas is hydrogen.

3. A process as claimed in claim 1, in which said reducing gas is hydrogen and in which said portion of hydrogen gas and $H_2S$ gas from said reducing zone is about 5 to 20% of the hydrogen gas and $H_2S$ gas from the reducing zone.

4. A process as claimed in claim 3, in which the acid leachable sulfide concentrate is subjected to an acid leach in aqueous sulfuric acid to produce a solution of ferrous sulfate and a beneficiated solids residue containing copper sulfides and residual iron with concurrent evolution of $H_2S$ gas, said beneficiating solids residue being amenable to recovery of copper, separating the ferrous sulfate solution to an iron removal step, passing the $SO_2$ from the oxidizing zone to an acid plant for production of sulfuric acid for use in the acid leach, and combining $H_2S$ in gases from the reducing zone not fed to the oxidizing zone with $H_2S$ from the acid leach for production and recovery of elemental sulfur.

5. A process as claimed in claim 4, in which the gases from the reducing zone not fed to the oxidizing zone comprise 80 to 95% of the gases therefrom.

6. A process as claimed in claim 4, in which the ferrous sulfate solution from the acid leach separated from the solids residue is oxidized and hydrolyzed in the presence of ammonia or ammonium or alkali-metal compound for precipitation of iron as jarosite with simultaneous generation of sulfuric acid, and recycling the sulfuric acid to the acid leach.

7. A process as claimed in claim 1 or 2, in which a ratio of $H_2S/(H_2+H_2S)$ of about 0.05:1.0 is maintained in said reducing zone.

8. A process as claimed in claim 1 or 3, in which about 10 to 15% of iron in said metal sulfide concentrates in the oxidizing zone is oxidized to ferromagnetic oxides and said ferromagnetic oxides are substantially reduced to metal sulfides in said reducing zone.

9. A process as claimed in claims 1, in which the oxygen in the oxidizing zone is provided by injecting oxygen, air or oxygen-enriched air at spaced intervals along the oxidizing zone.

10. A process as claimed in claim 1, in which the temperature in the oxidizing zone is in the range of 450° to 680° C. and the temperature in the reducing zone is in the range of 680° to 705° C.

* * * * *